United States Patent
Tamai

(10) Patent No.: US 8,122,483 B2
(45) Date of Patent: Feb. 21, 2012

(54) DOCUMENT FILE, DOCUMENT FILE GENERATING APPARATUS, AND DOCUMENT FILE USAGE METHOD

(75) Inventor: Yoshiyuki Tamai, Itami (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1040 days.

(21) Appl. No.: 12/003,035

(22) Filed: Dec. 19, 2007

(65) Prior Publication Data

US 2008/0201783 A1    Aug. 21, 2008

(30) Foreign Application Priority Data

Feb. 19, 2007 (JP) .................. 2007-038042

(51) Int. Cl.
G06F 7/04 (2006.01)
H04L 29/06 (2006.01)
(52) U.S. Cl. ............... 726/2; 726/27; 713/154; 713/162
(58) Field of Classification Search .................... 726/28, 726/2, 27; 713/154, 162
See application file for complete search history.

(56) References Cited

U.S. PATENT DOCUMENTS

| | | | | |
|---|---|---|---|---|
| 7,120,254 | B2* | 10/2006 | Glick et al. | 380/258 |
| 7,360,248 | B1* | 4/2008 | Kanevsky et al. | 726/21 |
| 7,559,081 | B2* | 7/2009 | Seidlein | 726/9 |
| 7,840,590 | B2* | 11/2010 | Tam et al. | 707/769 |
| 2003/0097054 | A1 | 5/2003 | Sasaki et al. | |
| 2003/0217137 | A1* | 11/2003 | Roese et al. | 709/223 |
| 2005/0125673 | A1* | 6/2005 | Cheng et al. | 713/182 |
| 2005/0272445 | A1* | 12/2005 | Zellner | 455/456.2 |
| 2008/0147614 | A1* | 6/2008 | Tam et al. | 707/3 |

FOREIGN PATENT DOCUMENTS

| | | |
|---|---|---|
| JP | 6-138969 A | 5/1994 |
| JP | 2001-344349 | 12/2001 |
| JP | 2003-219473 | 7/2003 |
| JP | 2004-185326 | 7/2004 |
| JP | 2005-56204 A | 3/2005 |
| JP | 2005-309887 | 11/2005 |
| JP | 2006-72808 A | 3/2006 |
| JP | 2006-092709 | 4/2006 |
| JP | 2006-099698 | 4/2006 |
| JP | 2006-155283 | 6/2006 |
| JP | 2006-267021 | 10/2006 |

OTHER PUBLICATIONS

Notification of Reasons for Refusal in JP 2007-038042 dated Dec. 9, 2008, and an English Translation thereof.

* cited by examiner

*Primary Examiner* — Mohammad Reza
(74) *Attorney, Agent, or Firm* — Buchanan Ingersoll & Rooney PC

(57) ABSTRACT

A document file is configured to restrict, without a costly special-purpose terminal or the like, use of document data contained therein, if the document data is taken out of a predetermined location. A document file contains (i) electronic document data, (ii) usage location information indicating one or more usage locations in which use of the electronic document data is less restricted, and (ii) a data management program that causes, when a user requests use of the electronic document data, a computer to request for user location information indicating the current location of the user. Under control of the data management program, use of the electronic document data is permitted within a first usage pattern, if the user location is included in the usage locations. If not, use of the electronic document data is prohibited or permitted within a second usage pattern which is more restricted than the first usage pattern.

18 Claims, 7 Drawing Sheets

DOCUMENT FILE, DOCUMENT FILE GENERATING APPARATUS, AND DOCUMENT FILE USAGE METHOD

This application is based on an application No. 2007-38042 filed in Japan, the contents of which are hereby incorporated by reference.

BACKGROUND OF THE INVENTION (1) Field of the Invention

The present invention relates to security of document data and especially to a technique of restricting usage locations of document data.

(2) Description of the Related Art

In recent years, business and government entities are facing the growing problem of leakage of confidential information as a result of, for example, careless handling. It is a must that each and every individual pays due attention. Yet, it is not sufficient to provide adequate security and various security measures have been suggested.

For example, one known system permits a user to make a data access to a server computer, on condition that the user is physically within a predetermined location (See JP Patent Application Publication No. 6-138969). In another known system, a terminal is provided with GPS to detect a current location of the terminal. The terminal, is permitted to use content data received from a server computer, on condition that the current location coincides with a predetermined location indicated by information stored on a memory card (JP Patent Application Publication No. 2005-56204). In yet another known system, a server computer grants an access right to a terminal based on the physical location of the terminal. The terminal is enabled to decrypt an electronic file only if the access right has been granted (JP Patent Application Publication No. 2006-72808).

Unfortunately, however, the above techniques known in the art have the following disadvantages. Although the above techniques achieve to protect data by restricting locations within which the data is permitted to be used, a costly special-purpose terminal needs to be provided and used to access the data. Thus, users of the system is forced to use a general-purpose terminal for routine work and to use the special-purpose terminal when accessing the protected data, which leads to workflow complication and inefficiency. It may be true that provision of costly special-purpose terminals to each and every user eliminates the complication. However, such a measure is impractical in view of high costs expected to be incurred.

In addition, the above prior art relates to security of data stored, for example, on a server computer. That is, no security is provided for data that is expected to be transferred out of a predetermined location and thus there is a need for such a new technique.

SUMMARY OF THE INVENTION

The present invention aims to provide a document file, a document file generating apparatus, and a document file usage method each of which controls access to data that is transferred out of a predetermined location, without employing a costly special-purpose terminal.

In order to achieve the above aim, the present invention provides a computer-readable recording medium having a document file recorded thereon. The document file includes: electronic document data that is available for use by a user; usage location information indicating one or more usage locations in which use of the electronic document data is less restricted than in other locations; and a data management program that causes a computer to (i) make, in response to a user request for use of the electronic document data, a request for usage location information indicating a current location of the user, (ii) judge, upon acquisition of the user location information, whether or not the current location of the user indicated by the acquired user location information is included in the one or more usage locations indicated by the usage location information, (iii) if the judgment results in an affirmative, the data management program causes the computer to permit use of the electronic document data within a first usage pattern, and (iv) if the judgment results in a negative, the data management program causes the computer to entirely prohibit use of the electronic document data or to permit use of the electronic document data within a second usage pattern that is more restricted than the first usage pattern.

In order to achieve the above aim, another aspect of the present invention provides a document file generating apparatus for generating the document file as defined above.

In order to achieve the above aim, yet another aspect of the present invention provides a document usage method of using a document file that contains (i) electronic document data, (ii) usage location information indicating one or more usage location in which use of the electronic document data is less restricted than in another location, and (iii) a control program for controlling use of the electronic document. The method includes: a user specifying step of specifying a user based on information input by the user; a program initiating step of initiating, by a client computer, the control program in response to a user request for use of the electronic document; a user location requesting step of requesting, by the client computer under control of the control program initiated in the program initiating step, a server computer to supply user location information that indicates a current location of the user specified in the user identifying step; an acquiring step of acquiring, by the client computer under control of the control program, the user location information that is supplied from the server computer in response to the request issued in the user location requesting step; a judging step of judging, by the client computer under control of the control program, whether or not the current location of the user acquired in the acquiring step is included in the one or more usage locations indicated by the usage location information; a first usage step of using, by the client computer under control of the control program, the electronic document data within a first usage pattern if the judgment in the judging step results in an affirmative; and a second usage step of using, by the client computer under control of the control program, the electronic document data within a second usage pattern that is more restricted than the first usage pattern if the judgment in the judging step results in a negative.

With the above-stated configuration, an individual document file is provided with a data management program. The data management program causes a computer to request another device, such as a server computer, for the current location of a user to make a judgment regarding a predetermined usage location. Thus, use of data transferred out of the predetermined usage location is duly restricted, without employing a costly special-purpose terminal.

In addition, the document file generating apparatus having the above-stated configuration generates a document file achieving the above-noted effect. Thus, security control is effected separately on individual documents.

In addition, according to the document usage method having the above-stated configuration, when a user accesses, on a client computer, to a document file containing electronic document data and a management program, the management program causes the client computer to request a server computer for the current location of the user to make a judgment regarding a predetermined usage location. Thus, use of data transferred out of the predetermined usage location is duly restricted, without employing a costly special-purpose terminal.

The document file may further include server specifying information that specifies a server computer to which the inquiry about the current location of the user is to be made. The data management program may cause the computer to make the request for the user location information to the server computer that is specified by the server specifying information, thereby causing the user location information to be acquired from the server computer.

With the above configuration, the setting may be made of the server computer to which an inquiry about the current location is to be issued. Thus, the use of the document data contained in individual document files may be managed collectively by a single server computer or distributed among a plurality of server computer. Thus, while use restricted is imposed on the basis of the individual document files, the security control may be carried out integrally.

The data management program may cause the computer to make the judgment as to whether or not the current location of the user is included in the one or more of usage locations, when a request is made to open the electronic document data. If the judgment results in the affirmative, the data management program may cause the computer to open the electronic document data in an editable mode. If the judgment results in the negative, the data management program may cause the computer to open the electronic document data in a viewable and non-editable mode or not to open the document.

With the above configuration, the document data is opened in an editable mode only with in a predetermined location, which reduces the risk of unauthorized tampering with the document data.

The document file may further include authorization information indicating a usage pattern of restrictively permitted use of the electronic document data. If the judgment results in the negative, the data management program may cause the computer to restrict use of the electronic document data according to the authorization information.

With the above configuration, a usage pattern may be set, and use of the document data outside a predetermined location is permitted only within a range of the usage pattern. Thus, it is possible to restrict use of document data according to the level of confidentiality of the document data.

If the user location information is failed to be acquired despite the request for the user location information, the data management program may cause the computer to impose, on use of the document data, a similar restriction to the restriction imposed when the judgment results in the negative.

With the above configuration, in the case where the user location information is failed to be obtained, because of e.g., access failure to the server computer, use of the document data is always restricted in the same manner as use of the document data outside a predetermined location. In the case of such an expected situation, use restriction is imposed, so that the security is not loosened.

If the current location of the user is failed to be specified despite the request for the user location information, the data management program may cause the computer to impose, on use of the document data, a similar restriction to the restriction imposed when the judgment results in the negative.

With the above configuration, in the case where the current location of the user is failed to be specified because of e.g., failure of a positioning system, use of the document data is always restricted in the same manner as use of the document data outside a predetermined location. In the case of such an expected situation, use restriction is imposed, so that the security is not inadequately loosened.

While the electronic document data is in use within the first usage pattern, the data management program may further cause the computer to make another request for user location information indicating a current location of the user, to newly acquire the user location information, and to judge whether or not the current location of the user indicated by the newly acquired user location information is included in the one or more usage locations indicated by the usage location information. If the judgment made based on the newly acquired user location information results in a negative, the data management program may cause the computer to (i) forcefully terminate the use of the electronic document data within the first usage pattern and (ii) permit use of the electronic document data within the second usage pattern or to entirely prohibit use of the electronic document data.

With the above configuration, the current location of the user is checked even during the time the document data is in use within a predetermined location. On judging that the user location has moved outside the predetermined location, any usage activity according to the first usage pattern is forcefully terminated. Thus, the security is ensured against an attempt to unauthorized use of the document data that is made by opening the document data on a mobile terminal, such as a notebook computer, and moving the mobile terminal outside the predetermined location.

The document file may further include: first authorization information indicating the first usage pattern; and second authorization information indicating the second usage pattern. The data management program may cause the computer to (i) permit use of the electronic document data within the first usage pattern if the current location of the user is included in the one or more usage locations, and (ii) permit use of the electronic document data within the second usage pattern if the current location is not included in the one or more usage locations. After causing use of the document within the first usage pattern to be forcefully terminated, the data management program may cause the computer to alter at least either of the first and second authorization information to indicate more restricted use than normally permitted.

With the above configuration, when an attempt is made to improperly use the document data by opening the document data on a mobile terminal, such as a notebook computer, and moving the mobile terminal outside the predetermined location, the current use of the document is forcefully terminated. In addition, the authorization information is altered, so that subsequent use of the document is appropriately restricted.

The document file may further include: a termination counter that stores a count of how many times use of the electronic document data within the first usage pattern is forcefully terminated. The data management program may cause the computer to increment the termination counter, each time use of the electronic document data within the first usage pattern is forcefully terminated. When the termination counter reaches a predetermined count, the data management program may cause the computer to alter at least either of the first and second authorization information to indicate more restricted use than normally permitted.

With the above configuration, the authorization information is altered when the number of times of unauthorized use of the electronic document data reaches the predetermined count. Thus, the security control is exercised flexibly.

The electronic document data may have been converted into a format that is not usable unless decrypted by the computer under control of the data management program. The data management program may include a decryption protocol used to decrypt the converted electronic data into a format usable by the computer. If the current location of the user is included in the one or more usage locations, the data management program may cause the computer to decrypt the converted electronic document data using the decryption protocol and to use the electronic document data having been converted into a usable format. If the current location of the user is not included in the one or more usage locations, the management program may not cause the computer to decrypt the converted electronic document data, so that the electronic document data remains unusable.

With the above configuration, it is extremely difficult to decrypt the electronic document data, without properly employing the data management program. This substantially eliminates the risk that the document data is used with an unauthorized editor by a malicious third party.

In another aspect of the present invention provides a document file generating apparatus for generating a document file having any of the above configurations.

With the document file generating apparatus having the above configuration, the document file that achieves the above effects is generated.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1

<Overview>

According to an embodiment 1 of the present invention, an individual document file contains document data and a management program for managing the document data. The management program is provided with functions for use of the document data, such as an editor function and a viewer function exclusively for the document data. When a user requests use of the document data, the management program is initiated. Under control of the management program, an inquiry is made to a server computer about the current location of the user, and it is judged whether or not the user is in a predetermined usage location. If it is judged that the user is in the predetermined location, a wider range of usage activities is permitted to the user (e.g., the user is permitted to open and edit the document data with the editor). On the other hand, if it is judged that the user is not in the predetermined location, a restricted range of usage activities is permitted (e.g., the user is permitted to open and view the document data with a viewer but prohibited from editing the document data). Alternatively, use of the document data may be entirely prohibited if the user is not in the predetermined location.

<Structure>

Figure 1:
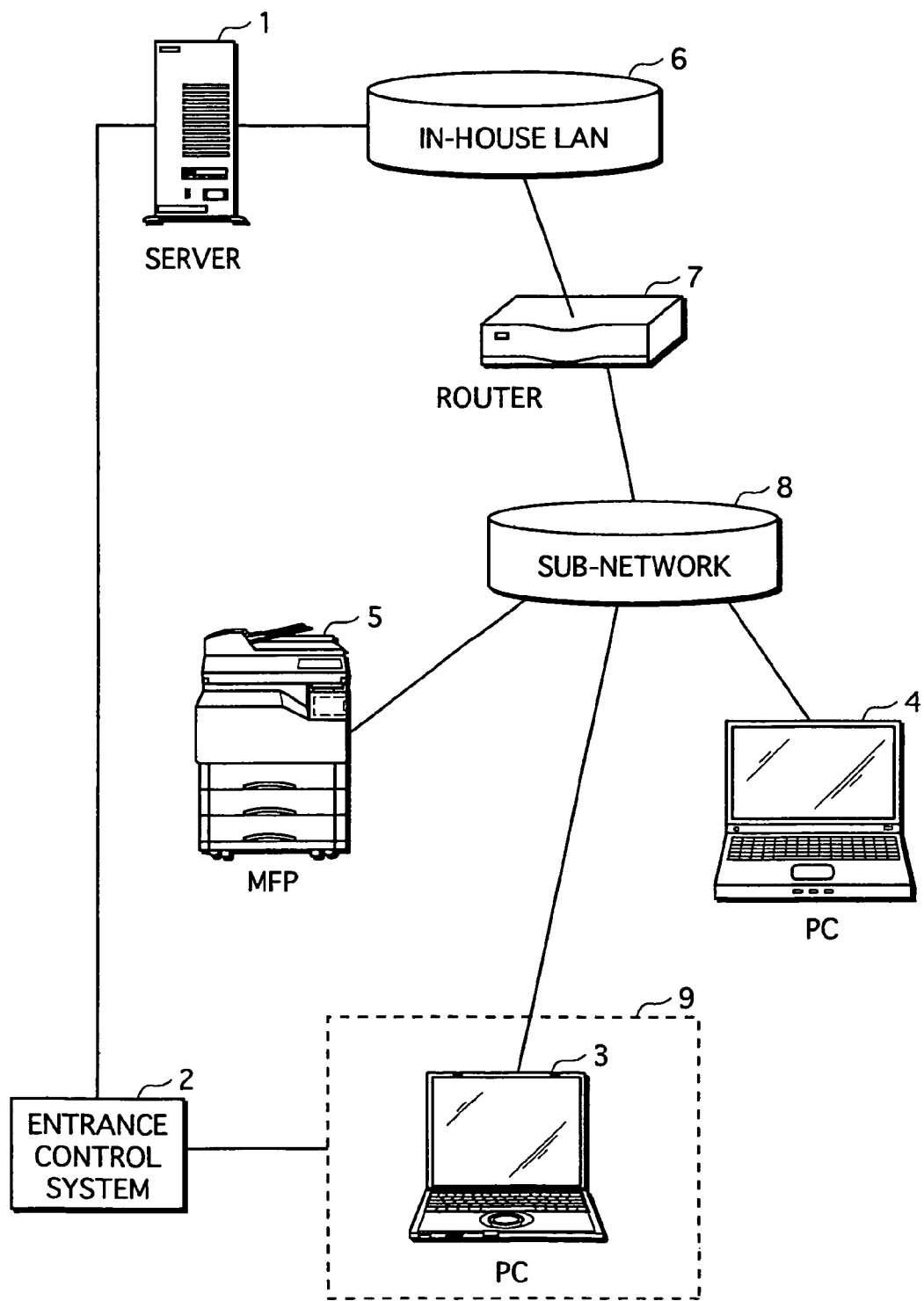
FIG. 1 is a view schematically illustrating a document use restriction system 10 according to an embodiment 1 of the present invention.

FIG. 1 is a view schematically illustrating a document use restriction system 10 according to the embodiment 1 of the present invention.

As illustrated in FIG. 1, the document use restriction system 10 according to the embodiment 1 includes a server 1, an entrance control system 2, PC terminals 3 and 4, an MFP 5, an in-house LAN 6, a router 7, and a sub-network 8.

The server 1 is a server computer that is locally connected to the entrance control system 2. The server 1 is also connected, via a network, to client computers typified by the PC terminals 3 and 4 and to an I/O device typified by the MFP 5. The server 1 receives from a client computer a request for user location information indicating the current location of a user. Upon receipt of the request, the server 1 acquires the current location of the user from the entrance control system 2 and returns the user location information to the client computer having issued the request.

The entrance control system 2 manages and keeps a record of each user's entering and leaving a predetermined location, such as an office building or a laboratory. For example, the entrance control system 2 keeps track of the locations of users, with use of non-contact IC cards provided to the individual users. Alternatively, biometric recognition such as iris or finger print scanning may be employed. Upon receipt of an inquiry from the server 1 about the current location of a specific user, the entrance control system 2 returns information indicating the current location of the user to the server 1.

Each of the PC terminals 3 and 4 is a client computer connected to an I/O device typified by the MFP 5 as well as to the server 1 via the network. When a user desires to use document data, the PC terminal directly receives user operations for input and output of the document data and accordingly makes access to a recording medium, such as DVD or HD, storing a document file containing the document data. As a result, the document data is used on the PC terminal.

For the purpose of description, it is supposed that the PC terminal 3 is located inside a laboratory 9 and that the PC terminal 4 is located outside the laboratory 9.

Figure 2:
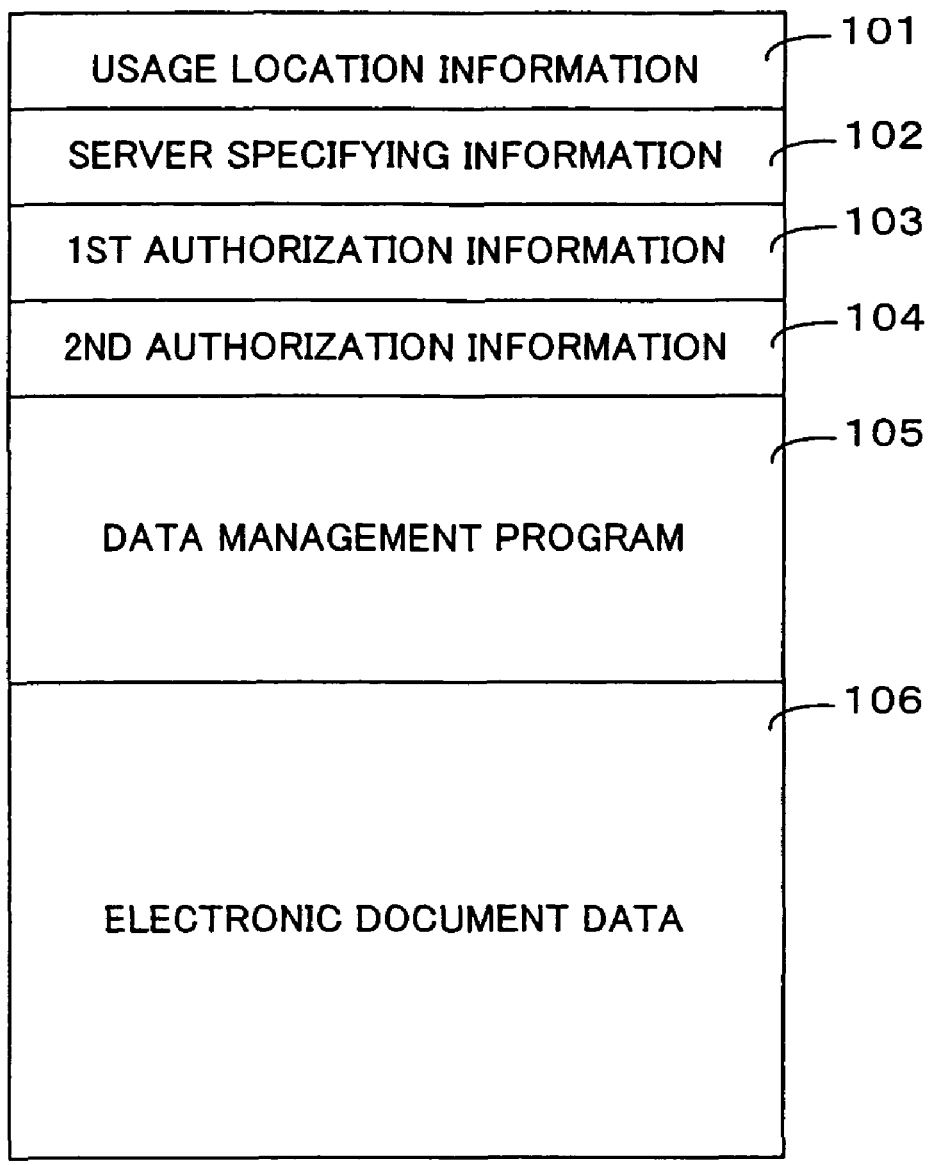
FIG. 2 is a view schematically illustrating the data structure of a document file 100 according to the present invention.

FIG. 2 is a view schematically illustrating the data structure of a document file 100 according to the present invention.

As illustrated in FIG. 2, the document file 100 contains usage location information 101, server specifying information 102, first authorization information 103, second authorization information 104, a data management program 105, and electronic document data 106.

The usage location information 101 indicates one or more usage locations in which use of the electronic document data 106 is less restricted than in other locations. Specifically, for example, the usage location information 101 indicates the "laboratory 9" to which physical access by the users is managed by the entrance control system 2.

The server specifying information 102 is information specifying a server computer to which an inquiry about user's current location is to be made. Specifically, for example, the server specifying information 102 indicates an URL of the server 1 or alternatively indicate an IP address and application port number of the server 1.

The first authorization information 103 indicates a first usage pattern which is a combination of usage activities permitted to a user that is physically present at one of the usage locations indicated by the usage location information 101. Specifically, for example, the first usage pattern is composed of the usage activities of edit, view, copy, and print.

The second authorization information 104 indicates a second usage pattern of usage activities permitted to a user on condition that the current location of the user is not included in the usage locations indicated by the usage location information 101. Specifically, for example, the second usage pattern is composed of the usage activities of view and print.

The data management program 105 is written in a script language, etc. and provided with functions for use of the electronic document data 106, such as an editor function and a viewer function exclusively for the electronic document data 106. Under control of the data management program 105, use of the electronic document data 106 is appropriately restricted. The data management program 105 is initiated when, for example, a user clicks a mouse on an icon of the document file 100 displayed on a client computer, such as the PC terminal 3 or 4, in order to use the electronic document data 106. Once initiated, the data management program 105 controls operation of the client computer.

Note that details of control of the data management program 105 exerted on the client computer by will be given later in the paragraphs with a heading "operation".

The electronic document data 106 represents a document offered for use. The electronic document data 106 is in encrypted form. Unless decrypted using a decryption protocol of the data management program 105, the electronic document data 106 cannot be used (edited, viewed, etc.) at all with a general-purpose editor, viewer, etc.

Note that the following arrangement may be made to prevent unauthorized use of the electronic document data 106 by a malicious user through tampering. That is, the electronic document data 106 may be encrypted using, as part of a key, a character string such as a hash value that is altered in response to any tampering with the usage location information 101, the server specifying information 102, the first authorization information 103, the second authorization information 104, and the data management program 105. When the document data stored in encrypted form is used, the character string needs to be re-calculated to decrypt the document data using the re-calculated character string. With this arrangement, if any information or program has been tamped with, it is extremely difficult to correctly decrypt the stored document data. Consequently, it is substantially impossible to use the document data, so that the risk of unauthorized use is substantially eliminated.

The MFP 5 is an I/O device that is connected to client computers typified by the PC terminals 3 and 4 and to the server 1, etc. via the network. In accordance with a print instruction received from the PC terminal 3 or 4, the MFP 5 prints out a document represented by the electronic document data 106.

Note that an "MFP" stands for a Multi-Function Peripheral and also known as an all-in-one peripheral. An MFP is a piece of hardware that combines at least two of the functions of copier, fax, printer, and scanner and is connected to a computer directly or via a network.

The in-house LAN 6, the router 7, and the sub-network 8 are all used to network together the server 1, the PC terminals 3 and 4, and the MFP 5.

Figure 3:
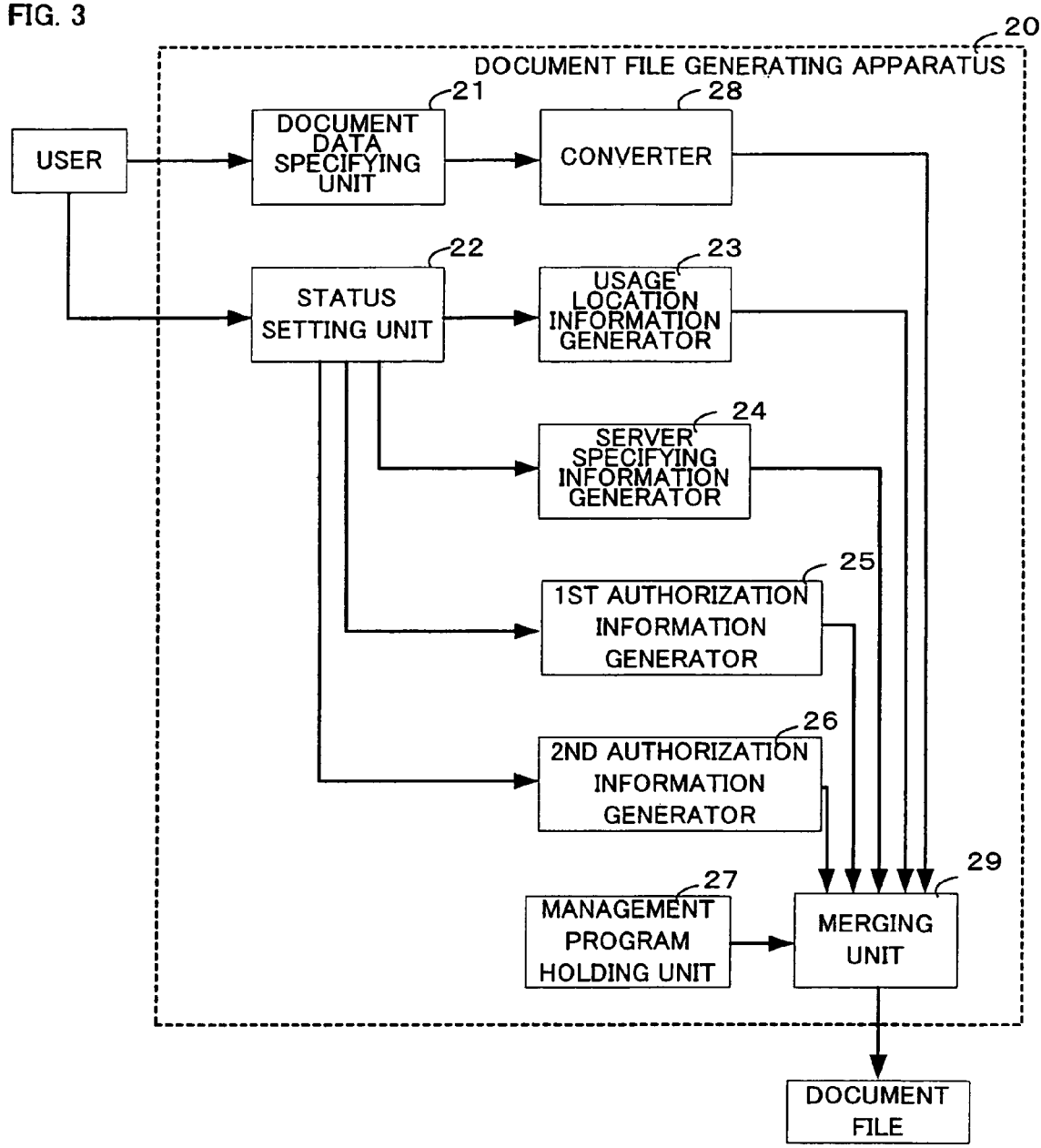
FIG. 3 is a view schematically illustrating a document file generating apparatus 20 according to the embodiment 1.

FIG. 3 is a view schematically illustrating a document file generating apparatus 20 according to the embodiment 1.

As illustrated in FIG. 3, the document file generating apparatus 20 according to the embodiment 1 includes a document data specifying unit 21, a status setting unit 22, a usage location information generator 23, a server specifying information generator 24, a first authorization information generator 25, a second authorization information generator 26, a management program holding unit 27, a converter 28, and a merging unit 29.

The document data specifying unit 21 receives a user input specifying a file containing document data to be protected by restricting usage locations of the document data.

The status setting unit 22 receives user input and selection regarding the status of the document data, including (i) one or more usage locations, (ii) a server computer to which an inquiry about user's current location is to be issued, and (iii) usage activities to be included in first and second usage patterns. The status setting unit 22 then causes the status of the document data to be set according to the received user input and selection.

The usage location information generator 23 generates usage location information indicating the one or more usage locations according to the user input and selection received by the status setting unit 22.

The server specifying information generator 24 generates server specifying information specifying the server computer according to the user input and selection received by the status setting unit 22.

The first authorization information generator 25 generates first authorization information indicating the first usage pattern according to the user input and selection received by the status setting unit 22.

The second authorization information generator 26 generates second authorization information indicating the second usage pattern according to the user input and selection received by the status setting unit 22.

The management program holding unit 27 holds actual data constituting the data management program 105.

The converter 28 converts the document data contained in the file specified by the user input received by the document data specifying unit 21. In principle, the document data after the conversion cannot be edited or viewed with a general-purpose editor or viewer, unless the document data is decrypted using the decryption protocol of the data management program 105.

The merging unit 29 merges, into a single document file, the usage location information generated by the usage location information generator 23, the server specifying information generated by the server specifying information generator 24, the first authorization information generated by the first authorization information generator 25, the second authorization information generated by the second authorization information generator 26, the management program held in the management program holding unit 27, the document data converted by the converter 28. The merging unit 29 outputs the resulting document file.

<Operation>

Figure 4:
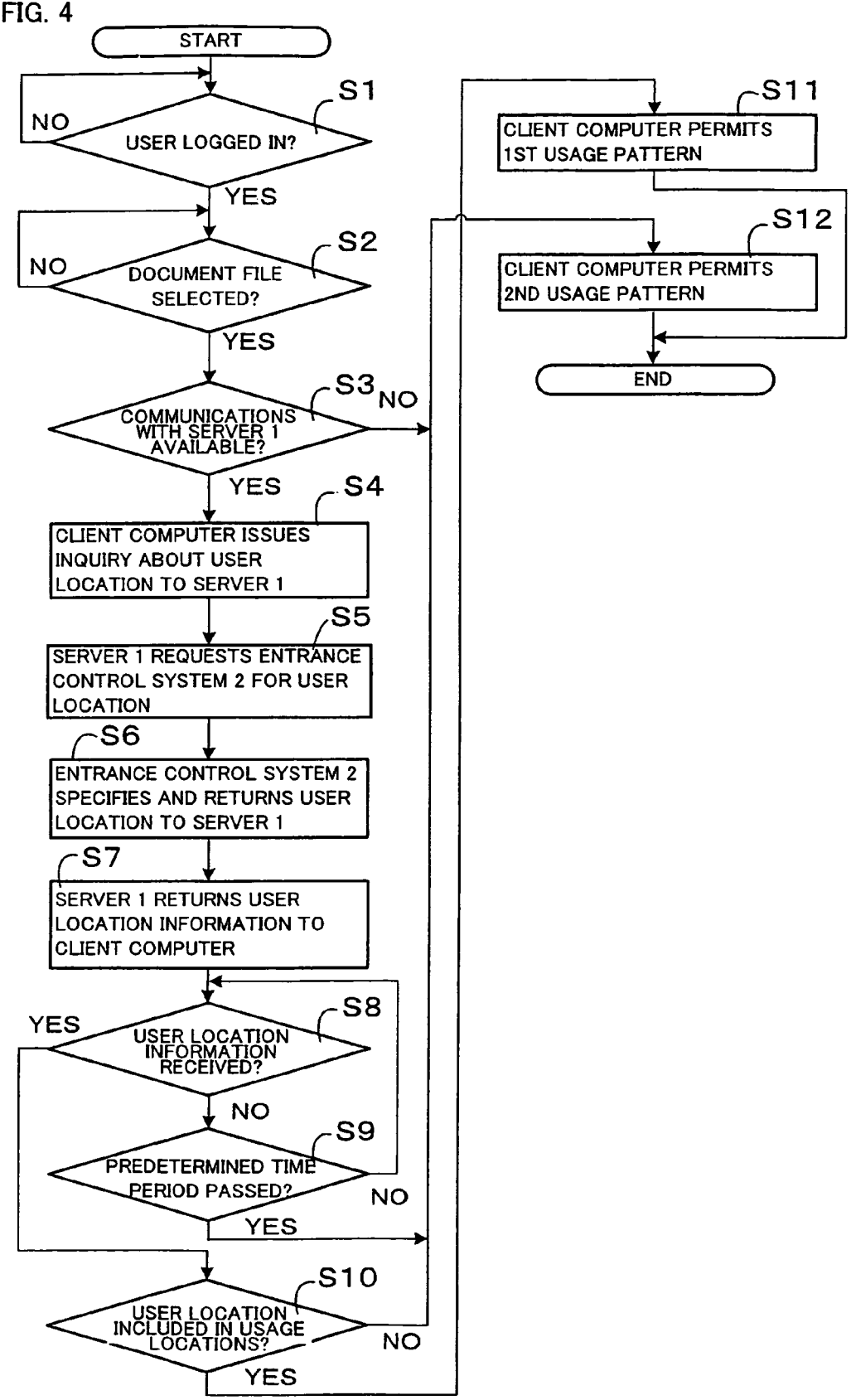
FIG. 4 is a flowchart of processing steps for restricting use of a document file.

FIG. 4 is a flowchart of processing steps for restricting use of a document file.

The following describes the processing steps for restricting use of a document file, with reference to FIG. 4.

(1) A client computer, namely the PC terminal 3 or 4, is in the wait state for a user to log in by entering user specifying information, such as a user ID and/or a password (Step S1).

(2) After the user logs in, the client computer is placed in the wait state for a user operation of accessing a recording medium, such as a DVD or HD, and selecting one of document files stored on the recording medium (Step S2). In this embodiment, the user selects the document file 100 and requests to open the document represented by the electronic document data 106.

(3) In response to the selection of the document file 100, the data management program 105 starts. Under control of the data management program 105, the client computer inquires as to whether communications with the server 1 that is specified by the server specifying information 102 are available (Step S3).

(4) If communications with the server 1 are available (Step S3: Yes), under control of the data management program 105, the client computer issues an inquiry to the server 1 via the network about the current location of the user having logged in (Step S4).

(5) The server 1 receives, from the client computer, the inquiry about the current user location, along with the user specifying information. In response, the server 1 requests the entrance control system 2 for data specifying the current location of the specified user (Step S5).

(6) Upon receipt of the request for the current user location from the server 1, the entrance control system 2 searches the records of users' entering and leaving for the current location of the specified user and returns the specified location to the server 1 (Step S6). In the case of failing to specify the current location of the user, the entrance control system 2 retunes information indicative of the failure.

(7) The server 1 receives the current location of the user from the entrance control system 2 and returns the user location information to the client computer having issued the request for the user location information (Step S7).

(8) Under control of the data management program 105, the client computer is placed in the wait state for receiving, from the server 1, the user location information of the user having logged in (Step S8).

(9) Under control of the data management program 105, the client computer judges whether or not a predetermined time period has passed without receiving the user location information (Step S9).

(10) Upon receipt of the user location information within the predetermined time period (Step S8: Yes), under control of the data management program 105, the client computer judges whether or not the user location indicated by the received user location information is included in the usage locations specified by the usage location information 101. In the case of receiving information indicating the failure to specify the current location of the user, the client computer regards that the user location is not included in the usage locations (Step S10).

(11) When it is judged that the current location of the user is included in the usage locations (Step S10: Yes), under control of the data management program 105, the client computer permits usage activities included in the first usage pattern indicated by the first authorization information 103 (Step S11). Consequently, for example, the client computer opens the selected document data in an editable mode with the editor. Suppose, for example, that a user logs in to the PC terminal 3 located in the laboratory 9, which is one of the predetermined usage locations, it is judged that the current location of the user is included in the usage locations. Thus, the document selected by the user is opened in an editable mode.

(12) In the case where communications with the server 1 are not possible (Step 3: No), where the predetermined time period has passed without receiving the user location information (Step S9: Yes), or where the current location is not included in the usage locations (Step S10: No), under control by the data management program 105, the client computer only permits usage activities included in the second usage pattern indicated by the second authorization information 104 (Step S12). Consequently, for example, the client computer opens the selected document data in a viewable mode with the viewer. Thus, the document data is presented to the user in a viewable but non-editable mode. Suppose, for example, a user logs in to the PC terminal 4 that is located outside the laboratory 9, which is one of the predetermined usage locations, it is judged that the current location of the user is not included in the usage locations. Thus, the selected document is not opened in an editable mode.

<Recapitulation>

As described above, according to the embodiment 1 of the present invention, an individual document file is provided with a data management program and a request is made to an external device, such as a server computer, for the current location of a user. The data management program restricts use of the electronic document data depending on the current location of the user. That is, use of document data that is taken outside the company is duly restricted without employing a special-purpose terminal, which incurs additional cost.

[Modification 1]

<Overview>

A modification 1 according to the present invention is based on the embodiment 1, with an additional function of repeating an inquiry about the current location of a user regularly or randomly to judge whether the current location of the user remains within the usage locations. If the judgment results disagrees with the previous judgment result, the permitted usage pattern is altered accordingly.

<Structure>

A configuration according to a modification 1 of the present invention is basically identical to the embodiment 1. The sole difference lies in details of control executed by the data management program 105.

<Operation>

Figure 5:
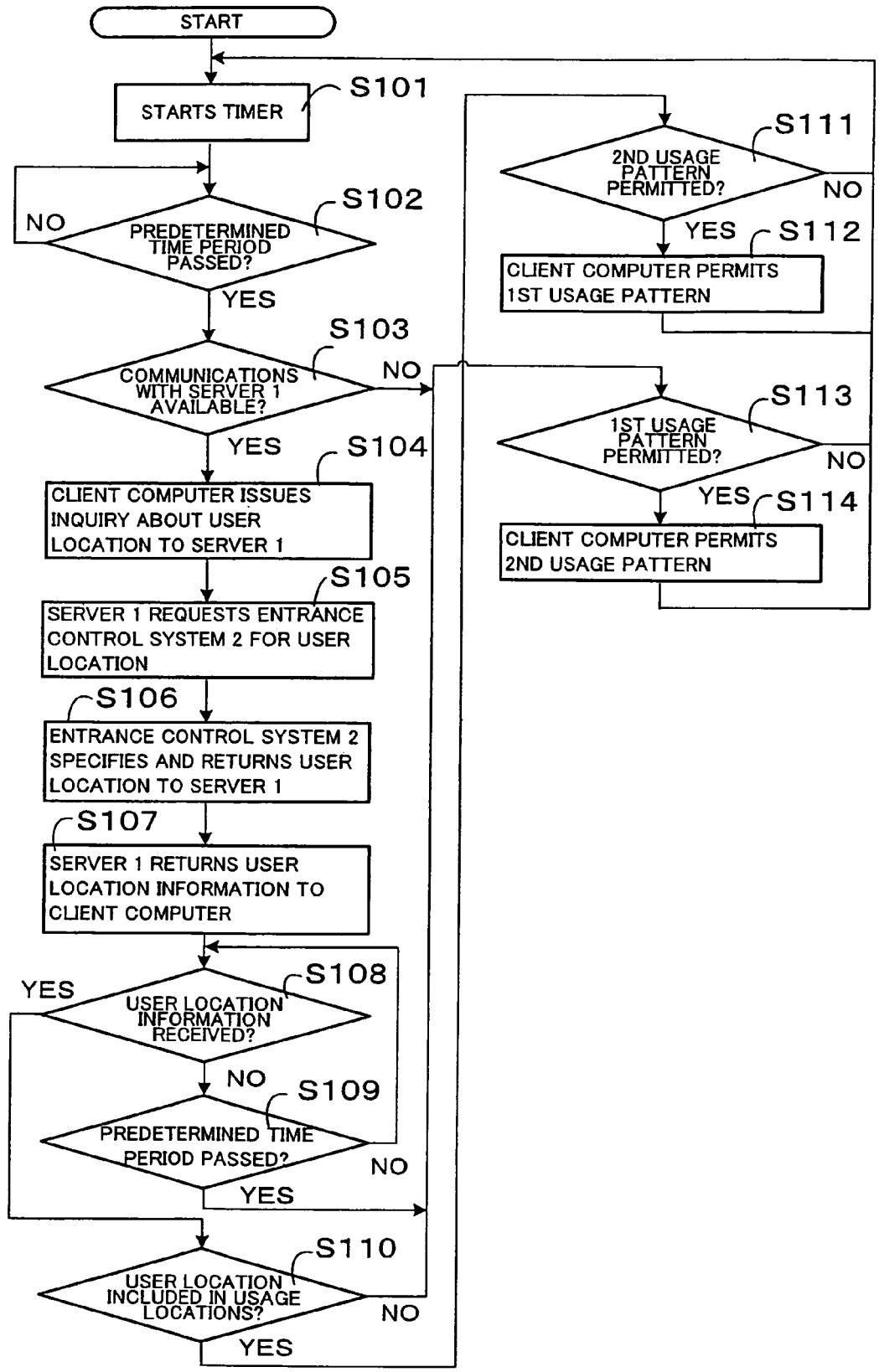
FIG. 5 is a flowchart of processing steps for updating a usage pattern during the time the electronic document data is in use.

FIG. 5 is a flowchart of processing steps for updating the usage pattern during the time the electronic document data is in use.

With reference to FIG. 5, the following describes the processing steps for updating the usage pattern during the time the electronic document data in use.

Under control of the data management program 105, the client computer stores therein whether the first or second usage pattern is permitted, each time when use of the electronic document data 106 is started or when the usage pattern is altered.

(1) Under control of the data management program 105, the client computer starts the timer (Step S101).

(2) The client computer is placed in the wait state until a predetermined time period passes (Step S102).

(3) Under control of the data management program 105, the client computer inquires as to whether communications with the server 1 that is specified by the server specifying information 102 are available (Step S103).

(4) If communications with the server 1 are available (Step S103: Yes), the data management program 105 makes an inquiry to the server 1 via the network about the current location of the user that is currently using the electronic document data 106 (Step S104).

(5) The server 1 receives from the client computer the inquiry attached with information specifying the user that is currently using the electronic document data 106. Upon receipt of the inquiry, the server 1 issues a request for the current location of the specified user to the entrance control system 2 (Step S105).

(6) Upon receipt of the request for the current user location from the server 1, the entrance control system 2 searches the records of users' entering and leaving for the current location of the specified user and returns the current location of the specified user to the server 1. In the case of failing to specify the current location of the user, the entrance control system 2 retunes information indicative of the failure, instead of the current location of the user (Step S106).

(7) The server 1 acquires the current location of the user from the entrance control system 2 and returns the user location information to the client computer having issued the request (Step S107).

(8) Under control of the data management program 105, the client computer is placed in the wait state for receiving, from the server 1, the user location information specifying the current location of the user that is currently using the electronic document data 106 (Step S108).

(9) The client computer judges whether or not the predetermined time period has passed without receiving the user location information (Step S109).

(10) When the client computer receives, from the server 1, the user location information of the specified user within the predetermined time period (Step S108: Yes), under control of the data management program 105, the client computer judges whether or not the current location of the user indicated by the received user location information is included in the usage locations indicated by the usage location information 101. In the case of receiving information indicating the failure to specify the current user location, the client computer regards that the current location of the user is not included in the usage locations (Step S110).

(11) When it is judged that the current location of the user is included in the usage locations (Step S110: Yes), under control of the data management program 105, the client computer judges whether or not the second usage pattern is permitted (Step S111).

(12) When it is judged that the second usage pattern is permitted (Step S111: Yes), the client computer so operates to permit the first usage pattern instead of the second usage pattern and goes back to Step S101 (Step S112).

(13) In the case where communications with the server 1 are not available (Step S103:No), where the predetermined time period has passed without receiving the user location information (Step S109: Yes), or where the current location of the user is not included in the usage locations (Step S110:No), the client computer judges, under control of the data management program 105, whether or not the first usage pattern is permitted (Step S113).

(14) When it is judged that the first usage pattern is permitted (Step S113: Yes), the client computer forcefully terminates any usage activity included in the first usage pattern, and only permits usage-activities included in the second usage pattern instead. Then, the processing returns to Step S101 (Step S114).

According to the modification 1, regardless of whether the first or second usage pattern is permitted, the client computer inquires about the current location of the user during the time the electronic document data is in use and judges whether or not the current location is included in the usage locations. If a different judgment is made from the immediately previous judgment, the usage pattern is updated. Yet, in view of the security, it is sufficient not to perform the above processing steps in the case where the second usage pattern is permitted. Although user convenience is sacrificed to some extent, it is sufficient that the inquiry and the judgment about the user location are made only when the first usage pattern is permitted. On judging that the current location is not included in the usage locations, the client computer forcefully terminates usage activities included in the first usage pattern. Instead of the first usage pattern, the client computer then permits usage activities included in the second usage pattern or totally prohibits use of the electronic document data.

<Recapitulation>

As described above, according to the modification 1 of the present invention, the current location of the user is checked during the time the electronic document data is in use and the usage pattern is updated accordingly. Thus, an appropriate action is taken even if the electronic document is opened on a portable terminal, such as a notebook computer, and the portable terminal is carried out of a predetermined usage location without closing the document. Consequently, the modification 1 of the present invention further improves the user convenience and the security.

[Modification 2]

<Overview>

A modification 2 according to the present invention is based on the embodiment 1, with an additional function of repeating an inquiry about the current location of a user regularly or randomly during the time electronic document is in use according to the first usage pattern. Each time the current location of the user is received, it is judged whether the current location of the user is included in the usage locations. If it is judged that the current user location is not included in the usage locations, any usage activity according to the first usage pattern is forcefully terminated. Instead of the first usage pattern, usage activities included in the second usage pattern are permitted or use of the electronic document data is totally prohibited. Then, the first and second authorization information are updated to permit more restricted usage patterns than normally permitted.

<Structure>

A configuration according to the modification 2 is basically identical to the embodiment 1. The sole difference lies in details of control executed by the data management program 105.

<Operation>

Figure 6:
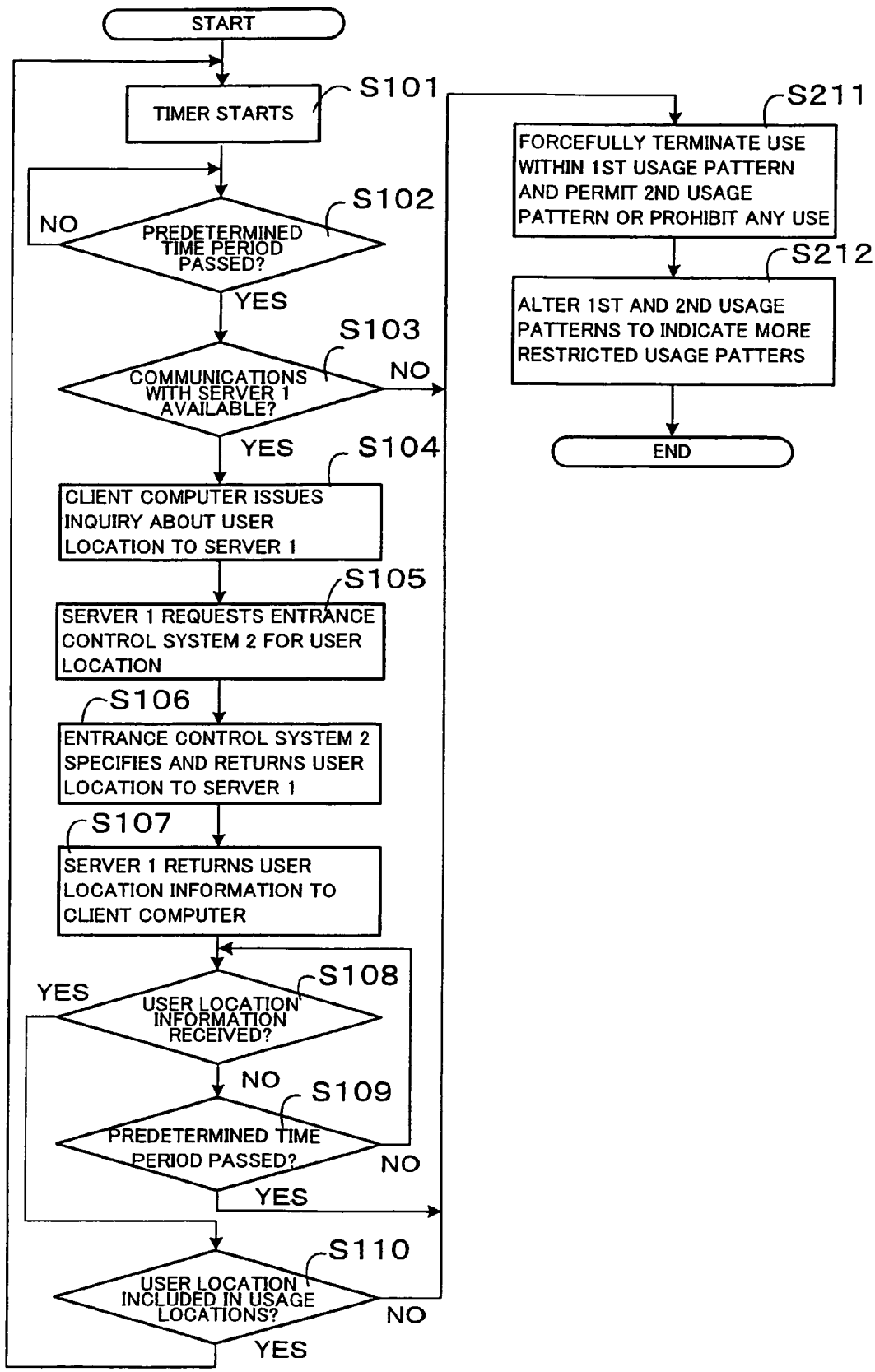
FIG. 6 is a flowchart of processing steps for (i) making an inquiry about the current location of a user, during the time an electronic document data is in use according to a first usage pattern, (ii) forcefully termination the use of the electronic document data, and (iii) altering authorization information to indicate a more restricted usage pattern.

FIG. 6 is a flowchart of processing steps for making an inquiry about the current location of a user, during the time the electronic document data is in use according to the first usage pattern. When appropriate, usage activities according to the first usage pattern is forcefully terminated and the authorization information is altered to indicate more restricted use.

With reference to FIG. 6, the following describes processing steps for forcefully terminating any usage activity included in the first usage pattern and for altering the authorization information to indicate more restricted use.

In FIG. 6, the same reference numerals are applied to the steps that are similar to the steps of the modification 1 shown in FIG. 5. Thus, no overlapping descriptions are given here.

(1)-(10) Those steps are identical to the corresponding steps of the modification 1 shown in FIG. 5 (Step S101-110).

If it is judged that the current location of the user is included in the usage locations (Step S110: Yes), the processing goes back to Step S101.

(11) In the case where communications with the server 1 are not available (Step S103: No), where the predetermined time period has passed before the user location information is received (Step S109: Yes), or where the current location is not included in the usage locations (Step S110:No), under control of the data management program 105, the client computer forcefully terminates any usage activity included in the first usage pattern. Instead of the first usage pattern, the client computer permits usage activities included in the second usage pattern or totally prohibits use of the electronic document data (Step S211).

(12) Then, the client computer alters the first and second authorization information to indicate more restricted usage patterns than normally permitted (Step S212). Specifically, for example, the first usage pattern normally permits edit, view, copy, and print is altered to permit view and print only. Similarly, the second usage pattern normally permits view and print is altered to permit view only.

<Recapitulation>

As described above, according to the modification 2 of the present invention, the current location of the user is checked even after once the user is confirmed to be at a predetermined location and permitted to use electronic document data. Upon judging that the user has moved outside of the predetermined location, any usage activity included in the first usage pattern is forcefully terminated. This arrangement prevents an inadequate attempt to use electronic document data outside the predetermined locations by carrying out a mobile terminal, such as a notebook computer, on which electronic document data remains opened. Consequently, the security further improves.

In addition, when it is judged that an inadequate attempt is made, in addition to forceful termination of the use of the document data, the authorization information is altered. Thus, the subsequent use of the electronic document data is appropriately restricted.

[Modification 3]

<Overview>

According to the modification 2, if the use of electronic document data according to the first usage pattern is forcefully terminated even once, the first and second authorization information are altered to indicate a usage pattern that is more restricted than the usage pattern normally permitted. According to a modification 3 of the present invention, an arrangement is made to keep the count of the number of times that the use according to the first usage pattern is forcefully terminated. The authorization information is left unaltered until the count reaches a predetermined count. The authorization information is altered when the predetermined count is reached.

<Structure>

The document file 100 according to the modification 3 additionally includes, as part of the first authorization information 103, a termination number counter that keeps the number of times that use of the document data according to the first usage pattern is forcefully terminated.

In addition to the provision of the termination number counter, the modification 3 differs from the embodiment 1 in details of control executed by the data management program 105.

<Operation>

Figure 7:
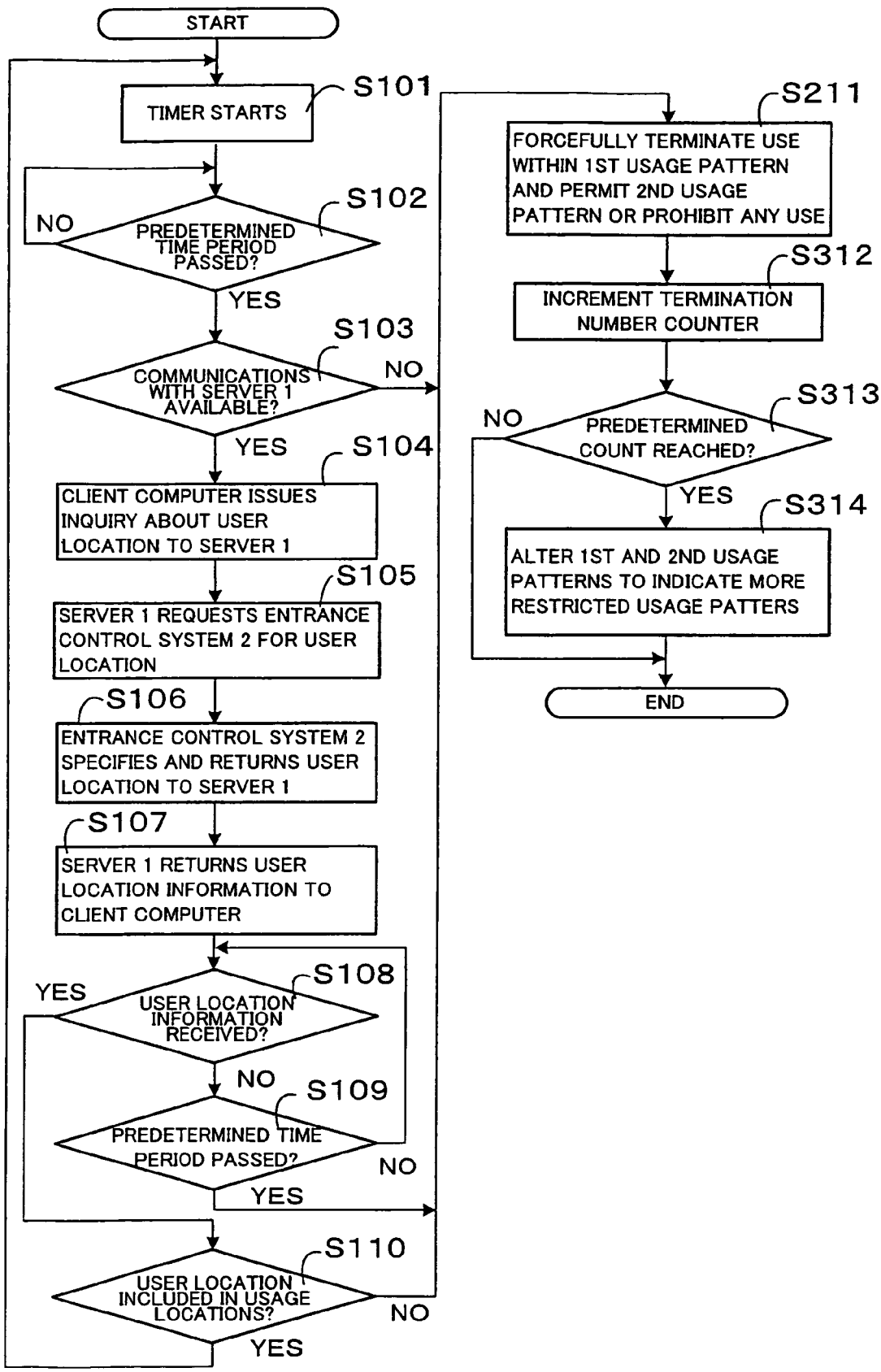
FIG. 7 is a flowchart of processing steps (i) for making an inquiry about the current location of a user during the time electronic document data is in use according to a first usage pattern, (ii) forcefully termination the use of the electronic document data, and (iii) altering authorization information to indicate a more restricted usage pattern according to the number of times of the forced termination.

FIG. 7 is a flowchart of processing steps performed for making an inquiry about the current location of a user during the time the electronic document data is in use according to the first usage pattern. When appropriate, usage activities according to the first usage pattern is forcefully terminated. The authorization information is altered to indicate more restricted use correspondingly to the number of times of forced termination.

With reference to FIG. 7, the following describes the processing steps for forcefully terminating any usage activity included in the first usage pattern and for altering the authorization information to indicate more restricted use correspondingly to the number of times of forced termination.

In FIG. 7, the same reference numerals are applied to the steps that are similar to the steps of the modifications 1 and 2 shown in FIGS. 5 and 6. Thus, no overlapping descriptions are given here.

(1)-(10) Those steps are identical to the corresponding steps of the modification 1 shown in FIG. 5 (Steps S101-110)

(11) The step is identical to the corresponding step of the modification 2 shown in FIG. 6 (Step S211).

(12) The termination number counter is incremented (Step S312).

(13) It is judged whether or not the termination number counter has reached the predetermined count (Step S313).

(14) If the predetermined count has been reached (Step S313: Yes), the first and second authorization information are altered to indicate the usage patterns that are more restricted than normally permitted (Step S314). Specifically, for example, the first usage pattern normally permits edit, view, copy, and print is altered to permit view and print only. Similarly, the second usage pattern normally permits view and print is altered to permit view only.

<Recapitulation>

As described above, according to the modification 3 of the present invention, the authorization information is altered when the number of times unauthorized use is attempted reaches the predetermined count. Thus, the security control is implemented flexibly.

According to the modifications 2 and 3, both the first and second authorization information are altered when use of electronic data in accordance with the first usage pattern is forcefully terminated. However, it is applicable to alter only either of the first and second authorization information.

In addition, the means employed to find the current location of a user is not limited to an entrance control system. The user location may be found with a GPS or a system using a mobile phone, such as PHS. Alternatively, the current location of a user may be determined based on the IP address of a client computer used by the user. Alternatively, it is applicable to employ a one-time password generator device installed at a usage location in a manner to be immovable to another location. The user location is specified when the user enters a password to the one-time password generator device.

It should be noted that a document file disclosed in any of the embodiment 1 and modifications 1-3 may be recorded on a computer-readable recording medium. Such a recording medium may be commercially or non-commercially distributed and traded. In addition, such a document file may be distributed and traded via a network, for example.

In addition, a computer-readable recording medium may store a computer program that causes, when executed by a computer, the computer to perform the processing steps of the document file generating apparatus disclosed in the embodiment 1. Such a program recorded on a recording medium may be commercially or non-commercially distributed and traded. In addition, such a program may be distributed and traded via a network, for example. In addition, such a program may be displayed on a display device or printed out so as to be presented to a user.

The computer-readable recording mediums mentioned above are not limited to any specific types. Examples of computer-readable recording mediums include removable recording medium such as a floppy disc, CD, MO, DVD, and memory card, as well as fixed recording mediums including a hard disk and semiconductor memory.

INDUSTRIAL APPLICABILITY

The present invention is applicable to a wide range of information devices to improve the security of document data. According to the present invention, use of document data outside a predetermined location is restricted. The restriction is imposed without the need for a special-purpose terminal and thus without additional cost. The present invention improves the security of document data without compromising neither the user convenience nor the cost effectiveness and is highly valuable in industrial use.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A nontransitory computer-readable recording medium, including:
    a document file recorded thereon, the document file comprising:
        electronic document data that is available for use by a user;
        usage location information indicating one or more usage locations in which use of the electronic document data is less restricted than in other locations; and
        a data management program that causes a computer to:
            (i) make, in response to a user request for use of the electronic document data, a request for usage location information indicating a current location of the user,
            (ii) judge, upon acquisition of the user location information, whether or not the current location of the user indicated by the acquired user location information is included in the one or more usage locations indicated by the usage location information, (iii) if the judgment results in an affirmative, permit use of the electronic document data within a first usage pattern, and (iv) if the judgment results in a negative, entirely prohibit use of the electronic document data or permit use of the electronic document data within a second usage pattern that is more restricted than the first usage pattern;
        wherein while the electronic document data is in use within the first usage pattern, the data management program further causes the computer to make another request for user location information indicating a current location of the user, to newly acquire the user location information, and to judge whether or not the current location of the user indicated by the newly acquired user location information is included in the one or more usage locations indicated by the usage location information, and if the judgment made based on the newly acquired user location information results in a negative, the data management program causes the computer to (i) forcefully terminate the use of the electronic document data within the first usage pattern and (ii) permit use of the electronic document data within the second usage pattern or to entirely prohibit use of the electronic document data.

2. The nontransitory computer-readable recording medium of claim 1, wherein the document file further comprises:
    server specifying information that specifies a server computer to which the inquiry about the current location of the user is to be made, and the data management program causes the computer to make the request for the user location information to the server computer that is specified by the server specifying information, thereby causing the user location information to be acquired from the server computer.

3. The nontransitory computer-readable recording medium of claim 1, wherein the data management program causes the computer to make the judgment as to whether or not the current location of the user is included in the one or more of usage locations, when a request is made to open the electronic document data, if the judgment results in the affirmative, the data management program causes the computer to open the electronic document data in an editable mode, and if the judgment results in the negative, the data management program causes the computer to open the electronic document data in a viewable and non-editable mode or not to open the document.

4. The nontransitory computer-readable recording medium of claim 1, wherein the document file further comprises:
    authorization information indicating a usage pattern of restrictively permitted use of the electronic document data, and if the judgment results in the negative, the data management program causes the computer to restrict use of the electronic document data according to the authorization information.

5. The nontransitory computer-readable recording medium of claim 1, wherein if the user location information is failed to be acquired despite the request for the user location information, the data management program causes the computer to impose, on use of the document data, a similar restriction to the restriction imposed when the judgment results in the negative.

6. The nontransitory computer-readable recording medium of claim 1, wherein if the current location of the user is failed to be specified despite the request for the user location information, the data management program causes the computer to impose, on use of the document data, a similar restriction to the restriction imposed when the judgment results in the negative.

7. The nontransitory computer-readable recording medium of claim 1, wherein the document file further comprises:
    first authorization information indicating the first usage pattern; and
    second authorization information indicating the second usage pattern, the data management program causes the computer to (i) permit use of the electronic document data within the first usage pattern if the current location of the user is included in the one or more usage locations, and (ii) permit use of the electronic document data within the second usage pattern if the current location is not included in the one or more usage locations, and after causing use of the document within the first usage pattern to be forcefully terminated, the data management program causes the computer to alter at least either of the first and second authorization information to indicate more restricted use than normally permitted.

8. The nontransitory computer-readable recording medium of claim 7, wherein the document file further comprises:
    a termination counter that stores a count of how many times use of the electronic document data within the first usage pattern is forcefully terminated, the data management program causes the computer to increment the termination counter, each time use of the electronic document data within the first usage pattern is forcefully terminated, and when the termination counter reaches a predetermined count, the data management program causes the computer to alter at least either of the first and second authorization information to indicate more restricted use than normally permitted.

9. The nontransitory computer-readable recording medium of claim 1, wherein the electronic document data has been converted into a format that is not usable unless decrypted by the computer under control of the data management program, the data management program includes a decryption protocol used to decrypt the converted electronic data into a format usable by the computer, if the current location of the user is included in the one or more usage locations, the data management program causes the computer to decrypt the converted electronic document data using the decryption protocol and to use the electronic document data having been converted into a usable format, and if the current location of the user is not included in the one or more usage locations, the management program does not cause the computer to decrypt the converted electronic document data, so that the electronic document data remains unusable.

10. A document file generating apparatus for generating the document file as defined by claim 1, the document file generating apparatus comprising:
   a computer for executing program code including:
      a converter for encrypting the requested electronic document data;
      a merging unit for merging the usage location information and the encrypted electronic document data and for outputting the merged result, as the document;
   wherein while the electronic document data is in use within the first usage pattern, the data management program further causes the computer to make another request for user location information indicating a current location of the user, to newly acquire the user location information, and to judge whether or not the current location of the user indicated by the newly acquired user location information is included in the one or more usage locations indicated by the usage location information, and if the judgment made based on the newly acquired user location information results in a negative, the data management program causes the computer to (i) forcefully terminate the use of the electronic document data within the first usage pattern and (ii) permit use of the electronic document data within the second usage pattern or to entirely prohibit use of the electronic document data.

11. The document file generating apparatus of clam 10, wherein the computer executing program code further includes
   a server specifying information generator for generating server specifying information such that the server specifying information is merged by the merging unit in the document file, the server specifying information specifying a server computer to which the inquiry about the current location of the user is to be made, and the data management program causing the computer to make the request for the user location information to the server computer that is specified by the server specifying information, thereby causing the user location information to be acquired from the server computer.

12. The document file generating apparatus of claim 10, wherein the data management program is merged by the merging unit in the document file, the data management program causing the computer receiving the document file to make the judgment as to whether or not the current location of the user is included in the one or more of usage locations, when a request is made to open the electronic document data, if the judgment results in the affirmative, the data management program causing the computer to open the electronic document data in an editable mode, and if the judgment results in the negative, the data management program causing the computer to open the electronic document data in a viewable and non-editable mode or not to open the electronic document data.

13. The document file generating apparatus of claim 10, wherein the merging unit further merges authorization information indicating a usage pattern of restrictively permitted use of the electronic document data in the document file, and if the judgment results in the negative, the data management program causes the computer to restrict use of the electronic document data according to the merged authorization information.

14. The document file generating apparatus of claim 10, wherein if the user location information fails to be acquired despite the request for the user location information, the data management program causes the computer receiving the data file to impose, on use of the electronic document data, a similar restriction to the restriction imposed when the judgment results in the negative.

15. The document file generating apparatus of claim 10, wherein if the current location of the user fails to be specified despite the request for the user location information, the data management program causes the computer receiving the data file to impose, on use of the electronic document data, a similar restriction to the restriction imposed when the judgment results in the negative.

16. The document file generating apparatus of claim 10, wherein the merging unit further merges first authorization information indicating the first usage pattern and second authorization information indicating the second usage pattern such that the data management program causes the computer receiving the document file to (i) permit use of the electronic document data within the first usage pattern if the current location of the user is included in the one or more usage locations, and (ii) permit use of the electronic document data within the second usage pattern if the current location is not included in the one or more usage locations, and after causing use of the electronic document data within the first usage pattern to be forcefully terminated, the data management program causes the computer to alter at least either of the first or second authorization information to indicate more restricted use than normally permitted.

17. The document file generating apparatus of claim 10, wherein the document file further includes a termination counter that stores a count of how many times use of the electronic document data within the first usage pattern is forcefully terminated such that the data management program causes the computer receiving the document file to increment the termination counter, each time use of the electronic document data within the first usage pattern is forcefully terminated, and when the termination counter reaches a predetermined count, the data management program causes the computer receiving the document file to alter at least either of the first or second authorization information to indicate more restricted use than normally permitted.

18. A document usage method of using a document file that contains (i) electronic document data, (ii) usage location information indicating one or more usage location in which use of the electronic document data is less restricted than in another location, and (iii) a control program for controlling use of the electronic document, the method comprising:

a user specifying step of specifying a user based on information input by the user;

a program initiating step of initiating, by a client computer, the control program contained in the document file in response to a user request for use of the electronic document data;

a user location requesting step of requesting, by the client computer under control of the control program initiated in the program initiating step, a server computer to supply user location information that indicates a current location of the user specified in the user identifying step;

an acquiring step of acquiring, by the client computer under control of the control program, the user location information that is supplied from the server computer in response to the request issued in the user location requesting step;

a judging step of judging, by the client computer under control of the control program, whether or not the current location of the user acquired in the acquiring step is included in the one or more usage locations indicated by the usage location information contained in the document file;

a first usage step of using, by the client computer under control of the control program, the electronic document data within a first usage pattern if the judgment in the judging step results in an affirmative; and a second usage step of using, by the client computer under control of the control program, the electronic document data within a second usage pattern that is more restricted than the first usage pattern if the judgment in the judging step results in a negative;

wherein while the electronic document data is in use within the first usage pattern, the control program further causes the client computer to make another request for user location information indicating a current location of the user, to newly acquire the user location information, and to judge whether or not the current location of the user indicated by the newly acquired user location information is included in the one or more usage locations indicated by the usage location information, and if the judgment made based on the newly acquired user location information results in a negative, the control program causes the computer to (i) forcefully terminate the use of the electronic document data within the first usage pattern and (ii) permit use of the electronic document data within the second usage pattern or to entirely prohibit use of the electronic document data.

* * * * *